Feb. 1, 1966  R. BIRMANN  3,232,043
TURBOCOMPRESSOR SYSTEM
Filed Jan. 13, 1964  5 Sheets-Sheet 1

INVENTOR.
RUDOLPH BIRMANN
BY
ATTORNEYS

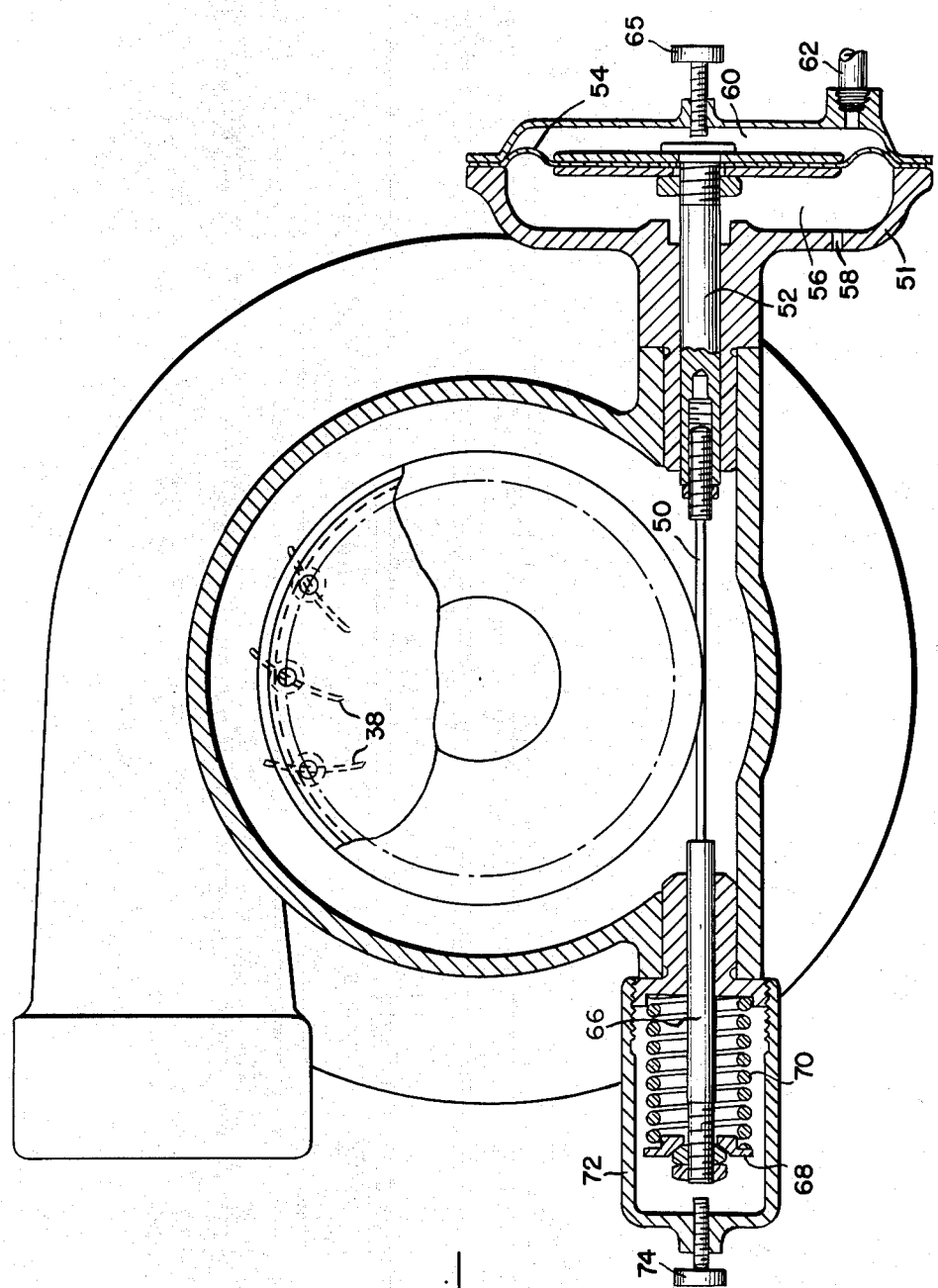

INVENTOR.
RUDOLPH BIRMANN
BY
ATTORNEYS

INVENTOR.
RUDOLPH BIRMANN
BY

ATTORNEYS

United States Patent Office 3,232,043
Patented Feb. 1, 1966

3,232,043
TURBOCOMPRESSOR SYSTEM
Rudolph Birmann, Highland Farm, R.D. 1, Newtown, Pa.
Filed Jan. 13, 1964, Ser. No. 337,382
20 Claims. (Cl. 60—13)

This invention relates to turbocompressor systems and particularly to turbochargers for internal combustion engines. While the invention is more broadly applicable, it will be described with particular reference to turbochargers.

In my Patent 3,059,415, dated October 23, 1962, there are described turbocharger systems for internal combustion engines particularly designed for use when the engines are operated under varying speed and load conditions. In particular said patent relates to the use of adjustable compressor inlet guide vanes for turbochargers by means of which the prewhirl component of flow in the direction of rotation of an impeller is increased with either decreasing fuel flow to the engine or decreasing engine speed, or both, thereby maintaining the speed of the turbocharger high over a wide range of engine operating conditions to achieve, in comparison with earlier conventional turbochargers, two main objectives: increased torque at low engine speeds, and elimination of the power and acceleration lag of the engine. As particularly pointed out in said patent, what is disclosed therein is of primary utility in turbocharged engine power plants for automotive vehicles, though the invention of the patent is applicable to other power plants where similar conditions may exist. The matters of the patent are applicable to both diesel engines and spark ignition engines.

In the case of spark ignition, particularly gasoline, engines, proper actuation of the guide vanes is quite simple. In effect, the guide vanes are merely substituted for the usual carburetor throttle and control the air flow to the engine. The carburetor, with the usual throttle omitted, is then responsive to the air flow and adds fuel thereto with the production of a nearly stoichiometric air-fuel ratio operation. This operation is illustrated in FIGURE 8 of said patent wherein the control of the air flow, by guide vane adjustment, is the primary control and the amount of fuel is controlled indirectly, without direct mechanical control.

In the case of diesel engines, it is desirable to retain direct mechanical control of the supply of fuel by using the normal diesel engine fuel control system and, in conformity with the prior patent, it would be evident to link the prewhirl control of the turbocharger compressor to this system. While the desired operation of the inlet guide vanes can actually be readily achieved in this fashion, the mechanical connection to the engine control system which is required has certain disadvantages of additional complexity and of requiring the use of such additional substantial mechanical effort to adjust vanes as to necessitate, in many cases, the addition of a servo system. Furthermore, since engines and turbochargers are usually made by different manufacturers there is some necessity for tailoring one to the other, and each manufacturer tends to resist modification of his part of the power plant to fit what is manufactured by the other.

In accordance with the present invention an automatic control system is provided, applicable to both diesel and spark ignition engines, which eliminates any necessity for tying together the compressor inlet guide vane control and the engine controls so that the turbocharger unit is completely self-contained and mechanically independent of the engine. Of course, the turbocharger and the engine must have properly related characteristics of operation for effective combination, but the engine and turbocompressor are independent units except for the air and exhaust gas connections. Manual or automatic control of the power plant as a whole is solely through the usual engine controls, corresponding adjustments of the turbocharger taking place, in effect, in response to engine demands for air, or possibly, in part, in response to exhaust gas temperatures.

Considerations of the mutual aspects of operation will be most conveniently referred to in discussions which follow.

The general objects of the present invention have to do with the attainment of the foregoing results, and these and other objects of the invention will become more apparent from the following description, read in conjunction with the accompanying drawings in which:

FIGURE 2 is a radial section taken on the surface indicated at 2—2 in FIGURE 1;

Figure 1:
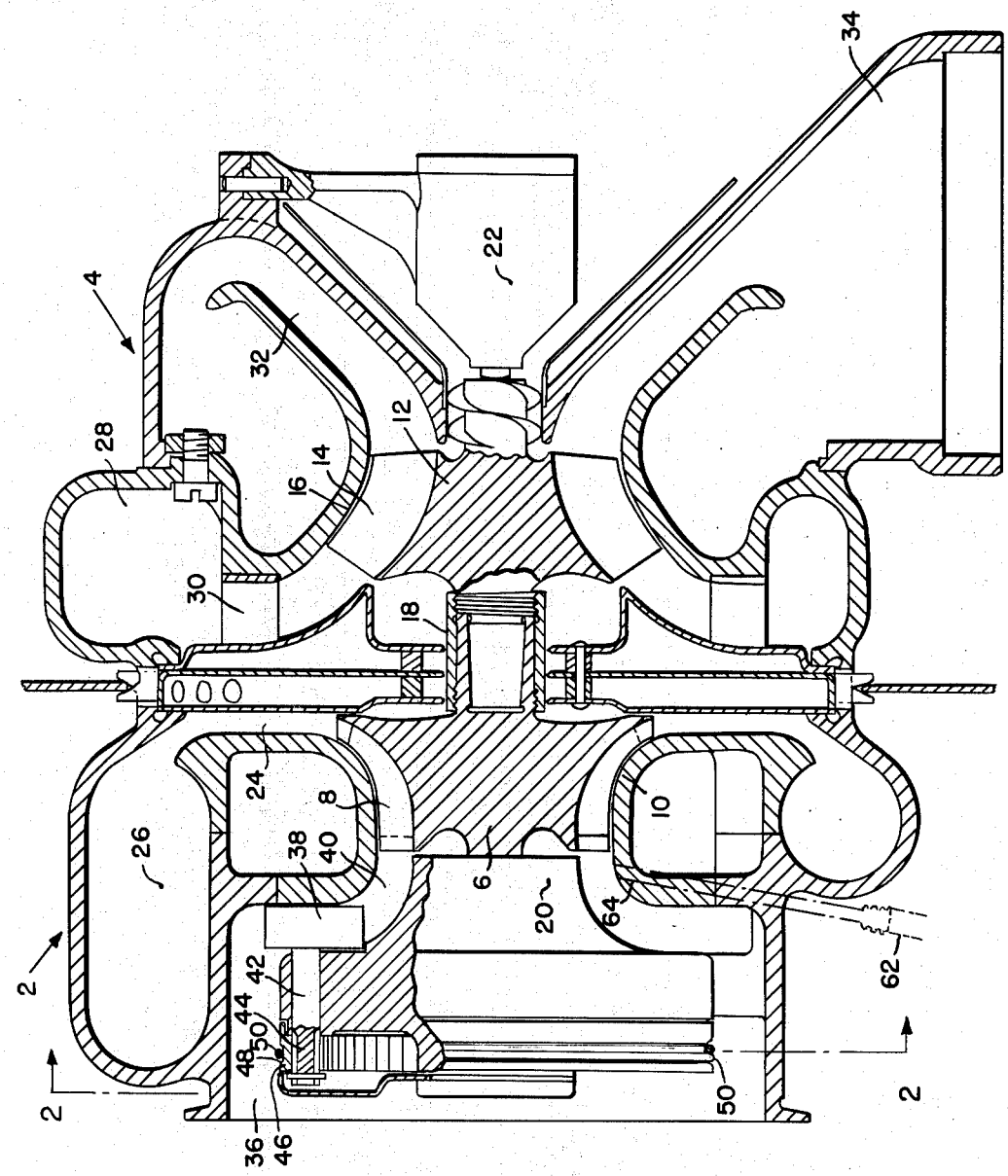
FIGURE 1 is an axial section through a turbocharger unit provided in accordance with the invention.

The turbocharger unit, except for the vane operating controls may have the characteristics of construction and operation shown in my prior patent and these will not be detailed herein. The turbocharger comprises the compressor section 2 and the turbine section 4 provided by housings coupled together and enclosing the operating parts. The compressor includes the hub 6 provided with the vanes 8 providing a mixed flow impeller. The vanes 8 are desirably of the two-part type described in said patent in order to accommodate widely varying angles of approach flow. The impeller passages are defined by the surface of the hub, the vanes, and the surface of rotation 10 of the housing.

The turbine comprises the hub 12 carrying the blades 14, with the gas passages defined by the surface of the hub, the blades and the surface of revolution 16 of the surrounding housing. The turbine is of the centripetal type and for reasons set forth in the patent the blades define passages as described therein producing a specially controlled pattern of acceleration of the gas flow.

The impeller and turbine rotors are coupled together as indicated at 18 and are provided with shaft extensions mounted in bearings indicated at 20 and 22.

Discharge of air from the impeller takes place through the vaneless radially arranged diffuser 24 into the scroll 26 from which air is delivered to the associated engine. Driving exhaust gases from the engine are delivered to the gas chest 28 from which they flow through nozzles 30 to the turbine passages. Instead of using nozzles 30, the gases may be delivered through an annular passageway in which spiral vortex flow is set up to provide the desired velocity for entrance to the turbine.

The gases discharged from the turbine passages between the blades 14 pass to the vaneless diffuser 32 for discharge to the atmosphere through the connection 34.

Air enters the compressor at 36 and is directed by the vanes 38, disposed desirably, but not necessarily, around a complete inlet circumference, which provide adjustable prewhirl into the annular passage 40 from which the flow enters the impeller passages provided by the blades 8. The vanes 38 are angularly adjustable in accordance with the invention and for this purpose are mounted on shafts 42 provided with pinions as indicated at 44 which mesh with the internal teeth of an annular gear 46, adjustment of which simultaneously adjusts all of the vanes 38 to the same angle. The exterior of the gear 46 is provided with an annular groove 48 within which there is wound a turn of a flexible cable 50 secured at one point to the gear 46. One end of the cable 50 is adjustably secured in a rod 52 carried by the diaphragm 54 located in a housing 51 which provides a pair of chambers on opposite faces of the diaphragm. As shown in FIGURE 2, the chamber 56 at the left of the diaphragm communicates with the atmosphere through an opening 58 while the chamber 60 at its right communicates through a tube 62 with a passage 64 in the compressor part of the housing which opens radially into the annular space 40 to provide a pressure at the right of the diaphragm 54 which is the static pressure at the inlet to the impeller vanes.

The other end of the cable 50 is connected to a rod 66 provided with a head 68 on which there bears a compression spring 70 to urge the rod 66 toward the left as viewed in FIGURE 2. The spring and left-hand end of the rod are enclosed in a housing 72 which carries a manually adjustable stop screw 74 limiting movement of the rod 66 toward the left.

A manually adjustable stop screw 65 may be provided to limit movement of the diaphragm 54 to the right as illustrated in FIGURE 2.

Figure 3:
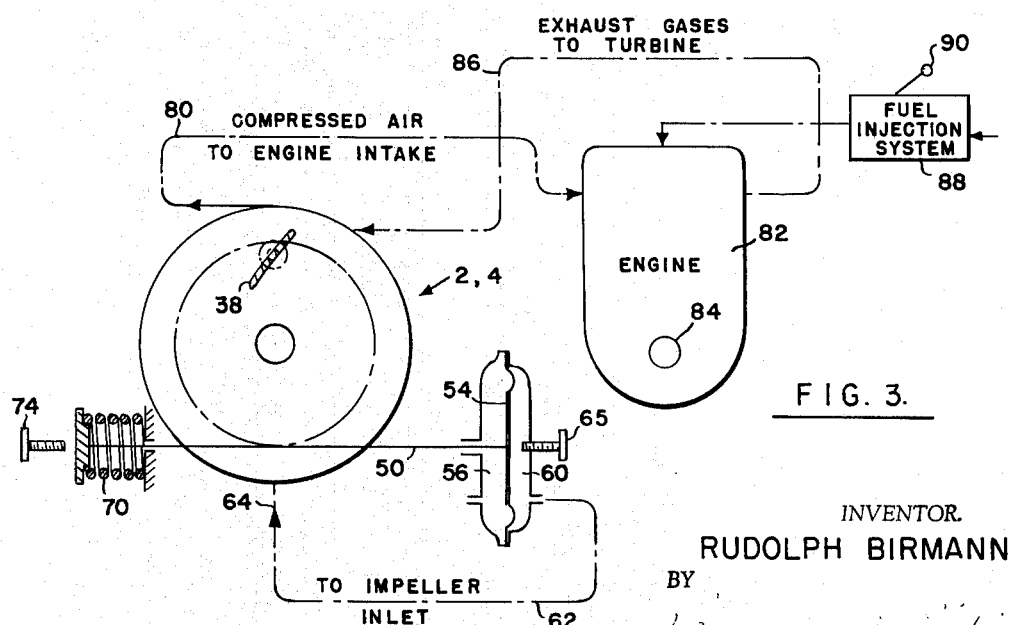
FIGURE 3 is a diagram illustrative of a complete power plant involving the turbocharger of FIGURES 1 and 2.

In order to make clear the complete power plant system, this is diagrammed in FIGURE 3 in which the operating elements heretofore described are designated by the same numerals, the turbocompressor being indicated generally at 2, 4. Compressed air is delivered through conduit 80 to the intake of the engine 82 which for purposes of present description may be assumed to be a diesel engine, though the invention is also applicable to spark ignition engines. The engine shaft through which power is delivered is indicated at 84. The exhaust gases from the engine are delivered through the conduit 86 to the turbine. The conventional fuel injection system to the engine is indicated at 88, control being illustrated as effected by means of a lever 90. As will be evident from the diagram, the turbocompressor unit and engine are mechanically independent and connected solely by the air and exhaust gas conduits. The operations, however, are interdependent as will appear hereafter.

If a spark ignition engine is involved, the fuel control will, of course, be replaced by a conventional carburetor with control by a throttle.

Figure 4:
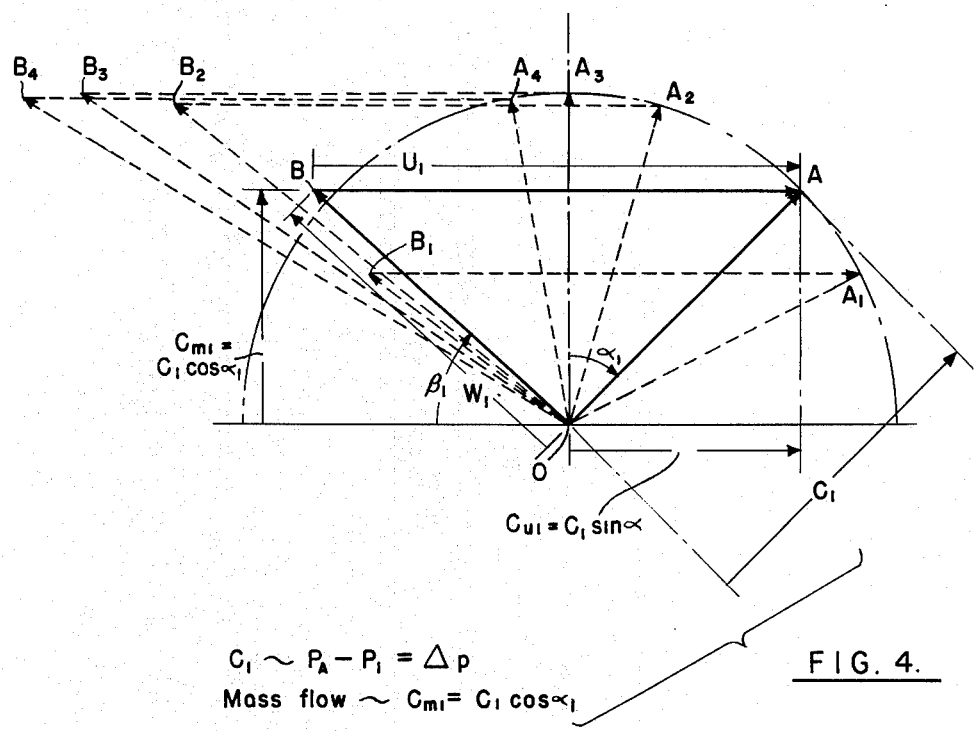
FIGURES 4 and 5 are vector diagrams explanatory of operation.

Reference may now be made to FIGURE 4 which is a vector velocity diagram illustrating certain of the basic matters involved in the automatic control system. For simplicity, the diagram is drawn with an assumption of constant speed of the turbocompressor and of constant absolute impeller approach velocity. While this and associated velocities vary over the radial extent of the impeller vane entrance edges, the velocities illustrated may be regarded as mean velocities for this analysis of operation. $U_1$ is a mean peripheral velocity at the impeller van inlet edge and $C_1$ is such mean absolute velocity of the approach air flow at the impeller inlet. Considering first the vector triangle OAB, $C_{u1}$ is the whirl component of the air approaching the impeller for a given helix angle $\alpha_1$ of the flow measured from the axial direction. This angle $\alpha_1$, it may be noted, is not the guide vane angle, but is functionally related thereto in a monotonic fashion, the vane angle imparting a spin to the entering air setting up a vortex flow and establishing an angle of approach at the inlet edges of the impeller vanes given by $\alpha_1$. The functional relationship, however, is such that if the guide vanes direct the inflowing air radially, without spin, $\alpha_1$ will be zero. As will be evident from the vector diagram $C_{u1}$ is equal to $C_1 \sin \alpha_1$.

The relative velocity of the air with respect to the impeller at the inlet is $W_1$ and $\beta_1$ is the relative flow angle measured with respect to a radial plane.

The meridional (axial component) of $C_1$ is $C_{m1}$ which from the geometry will be seen to be $C_1 \cos \alpha_1$.

As indicated by the expression at the bottom of FIGURE 4, the absolute velocity $C_1$ is a monotonic function of the pressure drop through the passages defined by the guide vanes, $P_A$ indicating atmospheric pressure and $P_1$ indicating the static pressure at the impeller inlet, this difference being indicated as $\Delta P$. The functional relationship is, of course, not linear, but for any given pressure drop $C_1$ is constant.

The mass flow rate is directly proportional to the meridional flow component $C_{m1}$ and therefore to $C_1 \cos \alpha_1$.

The mass flow rate thus increases as $\alpha_1$ decreases. The power demand by the compressor from the turbine increases with mass flow rate and the significance of this will appear later.

Continuing with the assumption that $U_1$ and $C_1$ are constant, the functional relationship between the angle $\alpha_1$ and the mass flow may be followed by considering the several auxiliary vector triangles illustrated in FIGURE 4 as $OA_1B_1$, $OA_2B_2$, $OA_3B_3$ and $OA_4B_4$. It will be seen that for each value of mass flow there corresponds a definite angle $\alpha_1$. The three triangles $OA_1B_1$, OAB and $OA_2B_2$ illustrate the conditions as mass flow increases and $\alpha_1$ correspondingly decreases. $OA_3B_3$ indicates the conditions existing when $\alpha_1$ is zero, i.e. no spin is imparted to the air approaching the impeller, under which condition the mass flow rate is maximum, other conditions being the same. $OA_4B_4$ indicates the conditions which exist when the spin is negative, i.e. in a direction opposite that of the impeller rotation, $\alpha_1$ being negative.

While the diagram as so far discussed assumes the maintenance of a constant $C_1$ by control of a constant pressure drop $P_A - P_1$, it will be evident that the relationships indicated are valid for a single vector triangle even if this is not the case. The relationships are also valid with variation of $U_1$. The deviations from these assumptions will now be discussed.

Figure 5:
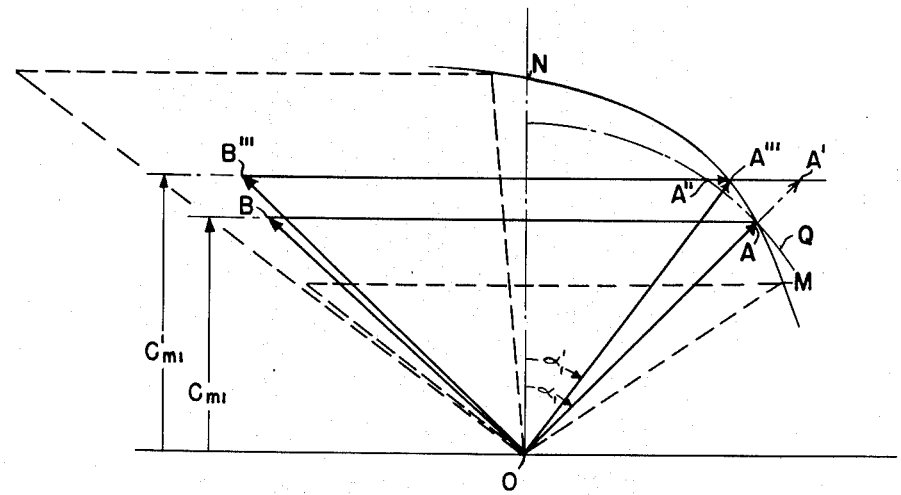

The independent variable in operation of the power plant is, in general, the mass flow determined by the piston displacement of the four cycle engine per unit time, assuming a normal overall operation in which air is supplied to the engine at an approximately constant pressure. As the engine speeds up, the mass flow demanded by it increases and vice versa. Reference to FIGURE 5 will indicate generally what occurs.

The vector triangle OAB is here shown as in FIGURE 4. Assume now that the engine speeds up and, initially, without change of fuel supply, but due, for example, to decreased engine load. As a result the mass flow of air will increase demanding a change of $C_{m1}$ to $C'_{m1}$. Assuming for simplicity a step type of change, if $\alpha_1$ remained momentarily constant, $C_1$ would increase so that the vector OA would change to vector OA'. If, now, considering FIGURE 3, the spring 70 were assumed to have a very low stiffness so that the guide vanes 38 would be adjusted by increased pressure drop $P_A - P_1$, the point A' would be moved to A", the point of interception of the horizontal line corresponding to $C'_{m1}$ with the arc Q about O, restoring $C_1$ and the previous value of the pressure drop. But with an actual spring at 70 having stiffness, the increased pressure drop will not adjust the guide vanes to effect fully this result, and the guide vanes will be opened to a less extent giving rise to an equilibrium at which the original point A will move to a point such as A''' giving rise to the vector triangle OA'''B'''. The characteristic of operation of the system is then that with change of mass flow the point A will follow a curve such as MN, no longer concentric with the point O. The result, then, is a continuing change of the pressure drop which is thus maintained only approximately constant. If the foregoing occurs without increase of fuel supply, the temperature of the exhaust gases will drop, due to increased air flow, so that the speed of the turbocompressor may drop slightly.

If increase in speed of the engine is concurrent with increase of fuel supply, then more energy is available to drive the turbine the speed of which will accordingly increase, or remain constant, depending on the balance between the power absorbed by the compressor and the power developed by the turbine, so that the vector B'''A''' will also become longer.

The capability of the automatic control system to cause the turbocharger speed to be held high over a wide range of engine speeds and loads can best be explained by the following considerations: Assume that the conventional turbocharger without inlet guide vane control is arranged to operate at full speed so as to produce a high pressure ratio at half speed of the engine. If now the four-cycle engine speed is increased to full speed, the engine pumps approximately double the flow which approximately doubles the power required to drive the compressor at the same speed. If it is assumed that enough additional fuel is burned in the engine to maintain the same pre-turbine temperature, the power output of the turbine is much more than double because not only is the mass flow through the turbine doubled, but since the absolute pressure ahead of the turbine is dammed up to almost double the original value, the enthalpy drop through the turbine is also nearly double, with the end result that the turbine power output is approximately four times greater and can only be absorbed by the compressor if the speed is increased by a factor of approximately $\sqrt{2}$ or 41%, which would constitute a disastrous overspeed of the turbocharger. By controlling the pre-whirl of the compressor in the manner described the compressor becomes capable of absorbing the above tremendous increase of turbine output which is associated with an increase of the engine speed without any, or only a very modest, increase of the turbocharger speed. This is easily understood if it is remembered that the compressor input is $$kG(u_2 C_{u_2} - u_1 C_{u_1})$$

where $k$ is a constant, $G$ is the rate of mass flow in lbs./sec. and $u_2 C_{u_2}$ and $u_1 C_{u_1}$ the vortex strength at the impeller outlet and inlet respectively (that is the product of the whirl component and peripheral speed at these two points).

As described above, for small mass flows $G$ the guide vanes cause the whirl component to be positive, or in other words, directed in the direction of rotation of the impeller, as shown in FIGURE 5. (The air then has a driving or turbine action on the impeller.) And for this (as can be seen from the above formula) the power consumption of the impeller is relatively small. For larger airflows, the whirl component is decreased and for the maximum airflow, such as occurs under conditions of maximum engine speed and load, the whirl component is negative (see FIGURE 5), or in other words, the air is directed by the guide vanes in a direction opposite to that of the impeller rotation (braking action), so that the power necessary to drive the compressor is greatly increased, making it impossible for the turbine to drive it to overspeed.

The overall result of the foregoing is maintenance of the turbocompressor speed more nearly constant under varying engine operating conditions, and hence the desired overall operation is secured: namely that the turbocompressor speed is maintained at a high value to eliminate, in particular, the lag of speed when increasing demands are made on the turbocompressor by reason of the engine operation.

The shape of the characteristic MN may be varied as desired for a given power plant merely by change of the spring constant in the case of the modification so far described.

In the case of the arrangement shown in FIGURES 1, 2 and 3, the pressure drop across the guide vanes from atmospheric pressure to the sub-atmospheric pressure existing at the inlet to the impeller was used for control of the vane positions. Other means may be used for this control with similar but slightly varying characteristics. It is obvious that the vanes can be arranged to be subject to an aerodynamic turning moment by moving the center of the aerodynamic forces acting on the guide vanes away from their pivoting point. The resulting turning moment can be made to act in the same direction or in the direction opposite to the moment exerted by the spring on the guide vanes, and in this manner a great freedom in the choice of the relationship of the angle $\alpha$ and the pressure difference $\Delta P$ can be achieved.

Figure 6:
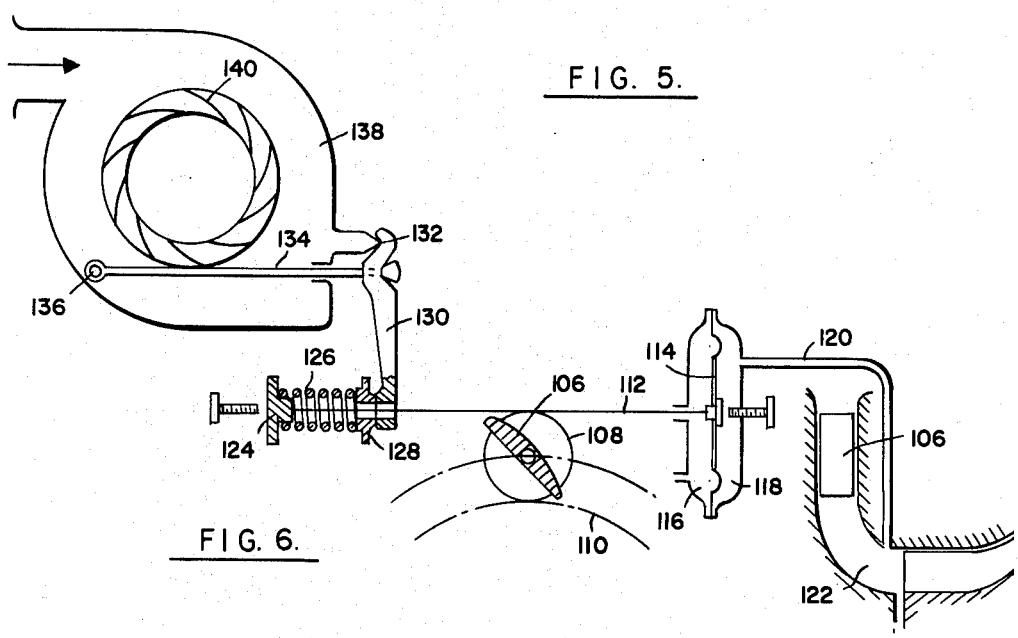
FIGURES 6 and 7 are diagrammatic views illustrating alternative systems for vane control.

Another modification is illustrated in FIGURE 6, in consideration of which it will be understood that the air and exhaust gas connection to the engine are provided as in FIGURE 3. In FIGURE 6 only one of the guide vanes of the ring surrounding the inlet to the turbine is illustrated at 106 and this is shown as in a balanced condition. To its shaft, as before, there is secured a pinion 108 meshing with the ring gear 110 which meshes with the corresponding pinions secured to the shafts of the other vanes. A cable 112 is illustrated as wound about a pulley carried by the pinion 108. At its right hand end the cable is connected to the diaphragm 114 separating the chamber 116 exposed to atmospheric pressure and the chamber 118 which is connected at 120 to the whirl chamber 122 of the impeller.

The left hand end of the cable 112 is connected to the collar 124 against which the compression spring 126 exerts a left-hand force. To the extent so far described, it will be evident that the arrangement is essentially the same from the standpoint of operation as that illustrated in FIGURE 3. However, instead of providing a fixed abutment for the spring 126, there is provided the collar 128 acted on by the lower end of a lever 130 pivoted at 132. This lever is arrested against the action of spring 126 by a rod 134 extending through the gas chest 138 of the turbine and anchored at its left hand end therein at 136. The vanes defining the turbine nozzle are indicated at 140. The rod 134 is provided by a metal having a high coefficient of expansion, and it will be evident that as the temperature in the gas chest rises the expansion of rod 134 will release the lever 130 causing the spring abutment 128 to move to the right, lessening the spring compression, and vice versa. The reason for this arrangement is the following:

If it is desirable to have the automatic control hold constant, or more nearly constant, turbocharger speed, the pre-turbine temperature must be maintained high even at light engine loads. For this purpose it is desirable to add a correcting influence so that the control mechanism, which as thus far described is sensitive only to rate of air flow, is additionally sensitive to pre-turbine temperature or its equivalent. If the pre-turbine temperature decreases, for example below some maximum which might typically be of the order of 1200° F., the contraction of the rod 134 tightens the spring 126 moving the guide vanes toward closed position resulting in a sequence of events as follows:

Because of reduced fuel flow to the engine, corresponding to reduced load, the exhaust temperature tends to drop and the turbine speed decreases. Thus the air flow is also reduced causing the diaphragm to close the guide vanes to some extent but not enough to maintain the maximum pre-turbine temperature and full speed. The contraction of the rod causes the guide vane to close still further until the pre-turbine temperature and the speed are, nearly, restored. This result is achieved because the movement of the guide vanes toward closed position will reduce the flow of air to cut down the excess flow relative to the fuel.

Figure 7:
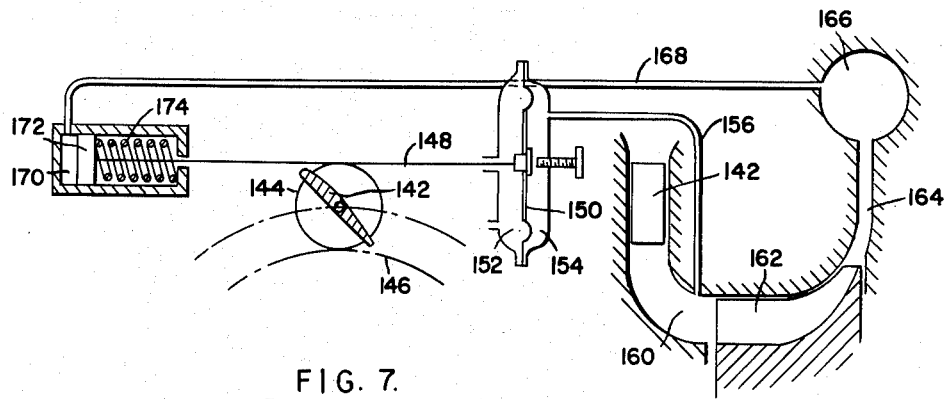

Pre-turbine temperature is a good measure of the ratio of air flow to fuel flow. Air flow is approximately proportional to the absolute compressor discharge pressure and the fuel flow is approximately proportional to the load in indicated horsepower developed by the engine. It follows, therefore, that the compressor discharge pressure can be used to effect an indirect temperature correction by making a correction for compressor discharge pressure as will now be described with reference to FIGURE 7. In FIGURE 7 one of the ring of guide vanes is indicated at 142, these being connected to the pinions 144 meshing with the ring gear 146 for simultaneous angular adjustment. A cable 148 is wound about a drum connected to one of the pinions 144 and at its right hand end is connected to the diaphragm 150 which, as before, separates the atmospheric pressure chamber 152 from a chamber 154 connected at 156 to the whirl space 160 at the inlet of the impeller 162. This impeller discharge through the radial diffuser 164 into the pressure chamber 166 from which air flow takes place to the engine intake. The chamber 166 is connected through pipe 168 to the closed end of a cylinder 170 in which there moves the piston 172 connected to the left hand end of the cable 148 and subjected to the compression of the spring 174. Aside from the action of the pressure in the chamber 166 on the piston 172, the operation would be as heretofore described. However, in this case an increase of pressure in chamber 166 will provide a force opposing that of the spring 174, this opposition increasing with the pressure in chamber 166. The area of the piston 172 will be fixedly related to the diaphragm area, and the ratio of these areas is chosen to suit the corrective action desired. Three forces thus act to balance in control of the guide vanes, and are made to balance along the maximum torque line of the operation referred to hereafter. At any operating point below this line the pressure in chamber 166 is lower than maximum and, therefore, the guide vanes assume a more closed position than they would without the pressure correction. This means that operation occurs at higher (substantially constant) turbocharger speed, with less air flow through the engine, and consequently higher, and more nearly constant, pre-turbine temperature.

Figure 8:
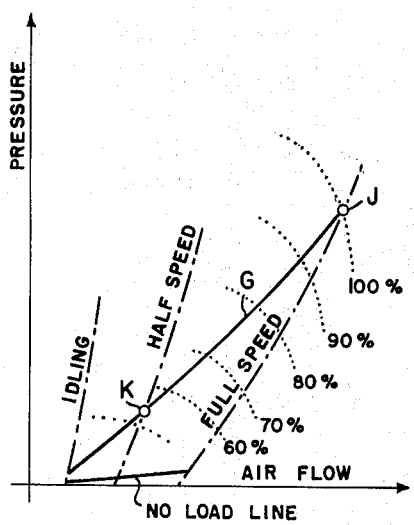
FIGURES 8 and 9 are pressure versus air flow diagrams illustrative of operations.
Figure 9:
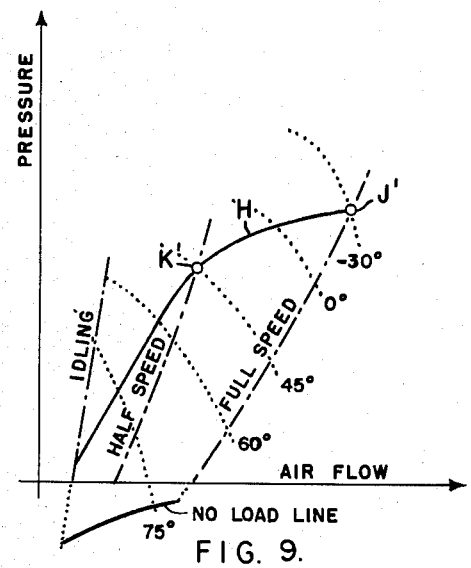

It has been mentioned that the turbocompressor and the characteristics of its vane controls should be chosen to conform to the engine with which it is associated. While this is a matter of design and within the skill of the art following the matters already discussed it will be informative to point out briefly the considerations generally involved by reference to FIGURES 8 and 9 which plot compressor pressure ratio against air flow, FIGURE 9 illustrating what is involved in the case of a turbocompressor of conventional type without prewhirl, and FIGURE 10 what is involved in the case of a turbocompressor in which variable prewhirl is involved. The former involves variable turbocompressor speed, while the latter involves substantially constant speed as provided by the prewhirl control.

Superimposed on the compressor characteristic curves shown by the dotted lines of these figures are engine air consumption lines which are designated for idling speed, half speed and full speed of the engine. As already indicated, these speeds largely determine the air demands from the turbocompressor. Exactly where along these engine air consumption lines operation of the turbocharger occurs depends on the turbine, the flow areas of which can always be so dimensioned that operation occurs on one definite point of one of the air consumption lines. For example, the turbine can be dimensioned so that with the given air flow it develops the power required to drive the compressor to result in operation at point J or J' on the full speed engine air consumption line.

This can be achieved under conditions of maximum allowable engine exhaust temperature corresponding to possible maximum engine brake mean effective pressure. Operation anywhere else within the stable region of the compressor then depends on the engine speed, the engine brake means effective pressure and exhaust temperature, turbine efficiency, compressor efficiency, the change in equivalent orifice area of the turbine and, in the case of an arrangement provided in accordance with the invention, the guide vane setting. The relationships between the many variables involved is complex and need not be discussed, but for the purpose of explaining the automatic control it will suffice to point to the end results that can be achieved with a unit properly matched to the engine. For example assume that considerations of engine smoking and engine durability limit the maximum allowable exhaust temperature to 1200° F. and that the turbine is matched to the engine so that with this preturbine temperature, full compressor speed, and full engine speed, operations are at the points J and J' respectively. Suppose, then, decrease of engine speed to half speed while at the same time the engine fuel supply rate is adjusted so that the exhaust temperature remains constant at the stated maximum of 1200° F. The operations of the prior art system (FIGURE 8) and the system controlled in accordance with the invention (FIGURE 9) are represented by the maximum torque lines J, K and J', K', respectively. Remembering that the engine torque is approximately proportional to the turbocharger compressor pressure ratio, it can be seen from a comparison of FIGURES 8 and 9 that the prewhirl control holds the compressor speed approximately constant resulting in a much higher low engine speed torque. For this the control system must automatically close the compressor inlet guide vanes from the more than full open position corresponding to negative pre-whirl. For example, for operation corresponding to the point J', $\alpha_1$ could be zero to minus 30° while for the reduced air flow corresponding to point K', $\alpha_1$ might be 45° or even larger. These angles are indicated by the dotted lines in FIGURE 9. The intermediate points on the line J'K' require intermediate guide vane settings. This is accomplished by selection of the proper characteristics of control as heretofore described.

With characteristics as stated, for the obtaining of maximum torque, or maximum brake mean effective pressure, over a wide range of engine speed, there can be followed what happens if the engine speed is mintained constant and the brake mean effective pressure is reduced. If this is done with the conventional turbocharger without prewhirl control, both the turbocharger speed (shown by the dotted line in FIGURE 8 in percentages of full speed) and the pre-turbine temperature drop off sharply. In the case of automatic control in accordance with the invention, the speed and pre-turbine temperature could be held very nearly constant but desirably are so controlled that they also drop; however, not nearly so rapidly. Since the speed reduction is relatively small it is rarely objectionable and the temperature reduction is even desirable because it is the result of a larger combustion air excess which is associated with better specific fuel consumption of the engine at part load.

Up to this point the discussion of the automatic control system and its adaptation to various service requirements has been confined to the high engine speed range from approximately ½ to full engine speed. In this speed range it is almost always desirable to maintain operation of the automatically controlled turbocharger at nearly full speed with maximum allowable pre-turbine temperature, at least under conditions of maximum brake mean effective pressure. At or near idling speed of the engine, however, it is often preferable, in the interest of specific fuel consumption, to influence the automatic control of the guide vanes so that they do not close quite as much as they otherwise would, thereby lowering the exhaust temperature for any given engine load, due to more air, even though this is associated with a lower turbocharger speed. For this purpose stops are desirable as already described to limit the extent to which the guide vanes can close. From the point where this stop is engaged the turbocharger behaves as a conventional one without prewhirl control, but one that has a much smaller capacity than that required for the high speed and high load range of the engine.

An effect similar to that of a stop but without the sudden discontinuity involved therewith can be accomplished by unbalancing the guide vanes so that the pressure difference across them tends to open them in a fashion similar to, but with a shorter distance between the center of pressure and pivot point, the arrangement described in FIGURE 6.

At or near the wide-open position of the guide vanes the turning moment resulting from such unbalance is negligible and does not affect the positioning of the guide vanes as it is controlled by the balance of the spring force against the force of the diaphragm. At small guide vane openings, corresponding for example to $\alpha_1$ equal to 45°, the turning moment becomes more and more appreciable and eventually makes it impossible for the spring to close the guide vanes more than to a certain point.

While the invention has been described with particular reference to turbochargers for internal combustion engines, it is also applicable to gas turbine power plants in which a combustion chamber would replace the engine. In fact, the invention is applicable to compressors, in effect providing compressors of improved characteristics, especially avoiding pulsation conditions.

It will be evident that various changes in details of construction and operation will be made without departing from the invention as defined in the following claims.

What is claimed is:

1. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, and means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when the engine idles under no load conditions, and decrease said whirl component to reach negative values with increase of said pressure drop.

2. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when the engine idles under no load conditions, and vice versa, and means limiting the increase of said whirl component.

3. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when the engine idles under no load conditions, and vice versa, and means limiting the decrease of said whirl component.

4. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop, and vice versa, and means for automatically varying said whirl component in accordance with the temperature of exhaust gases from said engine to increase said whirl component as said temperature decreases and vice versa.

5. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when the engine idles under no load conditions, and vice versa, and means for automatically varying said whirl component in accordance with the delivery pressure of said compressor to increase said whirl component as said delivery pressure decreases, and vice versa.

6. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, and means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when the engine idles under no load conditions, and vice versa, the last mentioned means comprising vanes located in the approach flow of air to said impeller blades, means mounting said vanes for movement under the action of pressure differences between their opposite surfaces to effect opening thereof, and decrease of said whirl component, when the last mentioned pressure difference increases, and vice versa, and spring means acting on said vanes and opposing such opening.

7. In a turbocharged engine power plant, an internal combustion engine, means for supplying fuel to said engine, a turbine, a centrifugal compressor driven by said turbine and having impeller blades, means for leading exhaust gases from said engine to said turbine to drive the latter, means for leading air delivered from said compressor to said engine to support combustion of the fuel in the engine, and means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when the engine idles under no load conditions, and vice versa, the last mentioned means comprising vanes located in the approach flow of air to said impeller blades, means mounting said vanes for movement under the action of pressure differences between their opposite surfaces to effect opening thereof, and decrease of said whirl component, when the last mentioned pressure difference increases, and vice versa, and spring means acting on said vanes and opposing such opening, there being means between said vanes and said spring means providing decreased torque by said spring means on said vanes as said vanes open and vice versa.

8. In combination with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, and means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when said device provides a low output of combustion gases to the turbine, and decrease said whirl component to reach negative values with increase of said pressure drop.

9. In combination with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when said device provides a low output of combustion gases to the turbine, and vice versa, and means limiting the increase of said whirl component.

10. In combustion with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when said device provides a low output of combustion gases to the turbine, and vice versa, and means limiting the decrease of said whirl component.

11. In combustion with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop, and vice versa, and means for automatically varying said whirl component in accordance with the temperature of exhaust gases from said device to increase said whirl component as said temperature decreases and vice versa.

12. In combination with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, means for automatically varying the whirl component of the air approaching the impeller blades in the direction of impeller rotation in accordance with the pressure drop between ambient atmospheric pressure and the static pressure of the air entering the impeller blades to increase said whirl component with decrease of said presure drop so that the turbine idles at relatively high speed when said device provides a low output of combustion gases to the turbine, and vice versa, and means for automatically varying said whirl component in accordance with the delivery pressure of said compressor to increase said whirl component as said delivery pressure decreases, and vice versa.

13. In combination with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, and means for automatically varying the whirl component of the air approaching the impeller blades in the direction of the impeller rotation in accordance with the pressure drop between ambient atmospheric pressure and the static pressure of the air entering the impeller blades to increase said whirl component with decrease of said pressure drop so that the turbine idles at relatively high speed when said device provides a low output of combustion gases to the turbine, and vice versa, the last mentioned means comprising vanes located in the approach flow of air to said impeller blades, means mounting said vanes for movement under the action of pressure differences between their opposite surfaces to effect opening thereof, and decrease of said whirl component, when the last mentioned pressure difference increases, and vice versa, and spring means acting on said vanes and opposing such opening.

14. In combination with a device for producing combustion gases, means for supplying fuel to said device, a turbine, a centrifugal compressor driven by said turbine and having impeller blades, means for leading combustion gases from said device to said turbine to drive the latter, means for leading air delivered from said compressor to said device to support combustion of the fuel therein, and means for automatically varying the whirl component of the air approaching the impeller blades in the direction of impeller rotation in accordance with the pressure drop between ambient atmospheric pressure and the static pressure of the air entering the impeller blades to increase said whirl component with decrease of said pressure drop so that the turbine idles at relatively high speed when said device provides a low output of combustion gases to the turbine, and vice versa, the last mentioned means comprising vanes located in the approach flow of air to said impeller blades, means mounting said vanes for movement under the action of pressure differences between their opposite surfaces to effect opening thereof, and decrease of said whirl component, when the last mentioned pressure difference increases, and vice versa, and spring means acting on said vanes and opposing such opening, there being means between said vanes and said spring means providing decreased torque by said spring means on said vanes as said vanes open and vice versa.

15. In combination, a centrifugal compressor having impeller blades, and means for automatically varying the whirl component of air approaching the impeller blades in the direction of impeller rotation in accordance with the pressure drop between ambient atmospheric pressure and the static pressure of the air entering the impeller blades to increase said whirl component with decrease of said pressure drop, and decrease said whirl component to reach negative values with increase of said pressure drop.

16. In combination, a centrifugal compressor having impeller blades, means for automatically varying the whirl component of air approaching the impeller blades in the direction of impeller rotation in accordance with the pressure drop between ambient atmospheric pressure and the static pressure of the air entering the impeller blades to increase said whirl component with decrease of said pressure drop, and decrease said whirl component to reach negative values with increase of said pressure drop, and means limiting the increase of said whirl component.

17. In combination a centrifugal compressor having impeller blades, means for automatically varying the whirl component of air approaching the impeller blades in the direction of impeller rotation in accordance with the pressure drop between ambient atmospheric pressure and the static pressure of the air entering the impeller blades to increase said whirl component with decrease of said pressure drop, and decrease said whirl component to reach negative values with increase of said pressure drop, and means limiting the decrease of said whirl component.

18. In combination, a centrifugal compressor having impeller blades, means for automatically varying the whirl component of air approaching the impeller blades in the direction of impeller rotation in accordance with the pressure drop between ambient atmospheric pressure and the static pressure of the air entering the impeller blades to increase said whirl component with decrease of said pressure drop, and decrease said whirl component to reach negative values with increase of said pressure drop, and means for automatically varying said whirl component in accordance with the delivery pressure of said compressor to increase said whirl component as said delivery pressure decreases, and vice versa.

19. In combination, a centrifugal compressor having impeller blades, and means for automatically varying the whirl component of air approaching the impeller blades in the direction of impeller rotation in accordance with the pressure drop between ambient atmospheric pressure and the static pressure of the air entering the impeller blades to increase said whirl component with decrease of said pressure drop, and decrease said whirl component to reach negative values with increase of said pressure drop, the last mentioned means comprising vanes located in the approach flow of air to said impeller blades, means mounting said vanes for movement under the action of pressure differences between their opposite surfaces to effect opening thereof, and decrease of said whirl component, when the last mentioned pressure difference increases, and vice versa, and spring means acting on said vanes and opposing such opening.

20. In combination, a centrifugal compressor having impeller blades, and means for automatically varying the whirl component of air approaching the impeller blades in the direction of impeller rotation in accordance with the pressure drop between ambient atmospheric pressure and the static pressure of the air entering the impeller blades to increase said whirl component with decrease of said pressure drop, and decrease said whirl component to reach negative values with increase of said pressure drop, the last mentioned means comprising vanes located in the approach flow of air to said impeller blades, means mounting said vanes for movement under the action of pressure differences between their opposite surfaces to effect opening thereof, and decrease of said whirl component, when the last mentioned pressure difference increases, and vice versa, and spring means acting on said vanes and opposing such opening, there being means between said vanes and said spring means providing decreased torque by said spring means on said vanes as said vanes open and vice versa.

References Cited by the Examiner
UNITED STATES PATENTS

| | | | |
|---|---|---|---|
| 2,412,365 | 12/1946 | Sollinger | 253—78 |
| 2,428,830 | 10/1947 | Birmann | 253—78 |
| 2,770,943 | 11/1956 | Beale | 253—52 X |
| 3,059,415 | 10/1962 | Birmann | 60—13 |
| 3,069,072 | 12/1962 | Birmann | 230—114 X |

SAMUEL LEVINE, *Primary Examiner.*
RICHARD B. WILKINSON, *Examiner.*